(12) United States Patent
Dikshit et al.

(10) Patent No.: US 12,739,191 B2
(45) Date of Patent: Sep. 15, 2026

(54) BROADCAST TRAFFIC FORWARDING AT A STITCHING BORDER NETWORK DEVICE

(71) Applicant: HEWLETT PACKARD ENTERPRISE DEVELOPMENT LP, Spring, TX (US)

(72) Inventors: Saumya Dikshit, Bangalore (IN); Pradeep Kumar Surendran, Bangalore (IN); Madhavi Murthi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 367 days.

(21) Appl. No.: 18/422,267

(22) Filed: Jan. 25, 2024

(65) Prior Publication Data

US 2025/0158918 A1 May 15, 2025

(30) Foreign Application Priority Data

Nov. 9, 2023 (IN) ............................ 202341076604

(51) Int. Cl.
*H04L 45/16* (2022.01)
*H04L 45/02* (2022.01)
*H04L 45/64* (2022.01)

(52) U.S. Cl.
CPC .............. *H04L 45/16* (2013.01); *H04L 45/04* (2013.01); *H04L 45/64* (2013.01)

(58) Field of Classification Search
CPC .......... H04L 45/16; H04L 45/04; H04L 45/64
See application file for complete search history.

(56) References Cited

U.S. PATENT DOCUMENTS 10,841,216 B1 * 11/2020 Hoang .................. H04L 12/465
11,303,474 B1 * 4/2022 Gornal M ............ H04L 12/413
2014/0301392 A1 * 10/2014 Jain ..................... H04L 12/1886 370/390
2015/0280928 A1 * 10/2015 Tessmer ................. H04L 12/18 370/390
2016/0285161 A1 * 9/2016 Apaydin ................ H01Q 1/521
2020/0136863 A1 * 4/2020 Huang .................... H04L 45/54
2020/0396103 A1 * 12/2020 Brissette ............. H04L 12/1886
2021/0083901 A1 * 3/2021 He .......................... H04L 12/46
2022/0086017 A1 * 3/2022 Johnsen .............. G06F 16/2255
2022/0321458 A1 * 10/2022 Lin ..................... H04L 41/0668
2022/0385620 A1 * 12/2022 Sinha .................... H04L 61/103
2023/0126279 A1 * 4/2023 Lin ..................... H04L 12/4645 370/389

OTHER PUBLICATIONS

Cisco, “VXLAN BGP EVPN based Multi-Site”, 2020, 121 Pages.

(Continued)

*Primary Examiner* — Harry H Kim
(74) *Attorney, Agent, or Firm* — Hewlett Packard Enterprise Patent Department

(57) ABSTRACT

In some examples, a stitching border network device includes a border tunnel endpoint to connect over a first tunnel to a first network device of a first physical domain, and over a second tunnel to a second network device of a second physical domain. A controller assigns a first broadcast group that includes the stitching border network device and the first network device of the first physical domain, and assigns a second broadcast group that includes the stitching border network device and the second network device of the second physical domain.

18 Claims, 5 Drawing Sheets

(56) References Cited

OTHER PUBLICATIONS

Cisco, Cisco Nexus 9000 Series NX-OS Vxlan Configuration Guide, Release 9.3(x), Last Modified: Sep. 22, 2021 (560 pages).
Cisco, Cisco Nexus 9000 Series NX-OS VXLAN Configuration Guide, Release9.3(x), Sep. 21, 2021 (24 pages).
Krattiger et al., "Multi-Site Solution for Ethernet VPN (EVPN) Overlay draft-sharma-bess-multi-site-evpn-03", Dec. 20, 2022, 42 pages.
Rabadan et al., "EVPN Multi-Homing Extensions for Split Horizon Filtering draft-nr-bess-evpn-mh-split-horizon-03", Sep. 9, 2020, 15 pages.
Sajassi et al., "BGP MPLS-Based Ethernet VPN", Request for Comments: 7432 , Feb. 2015, 56 pages.

* cited by examiner

600

Storage Medium

602 First Tunnel Information Reception Instructions

604 First Broadcast Group Assignment Instructions

606 Second Tunnel Information Reception Instructions

608 Second Broadcast Group Assignment Instructions

610 Tunnel Broadcast Group Assignment Information Storage Instructions

BROADCAST TRAFFIC FORWARDING AT A STITCHING BORDER NETWORK DEVICE

BACKGROUND

A network environment can include an underlay and overlay network, in which an overlay network is provided over an underlying (underlay) network. In some examples, a Layer 2 network (e.g., an Ethernet network) can overlay a Layer 3 network (e.g., an Internet Protocol (IP) network).

BRIEF DESCRIPTION OF THE DRAWINGS

Some implementations of the present disclosure are described with respect to the following figures.

Figure 1:
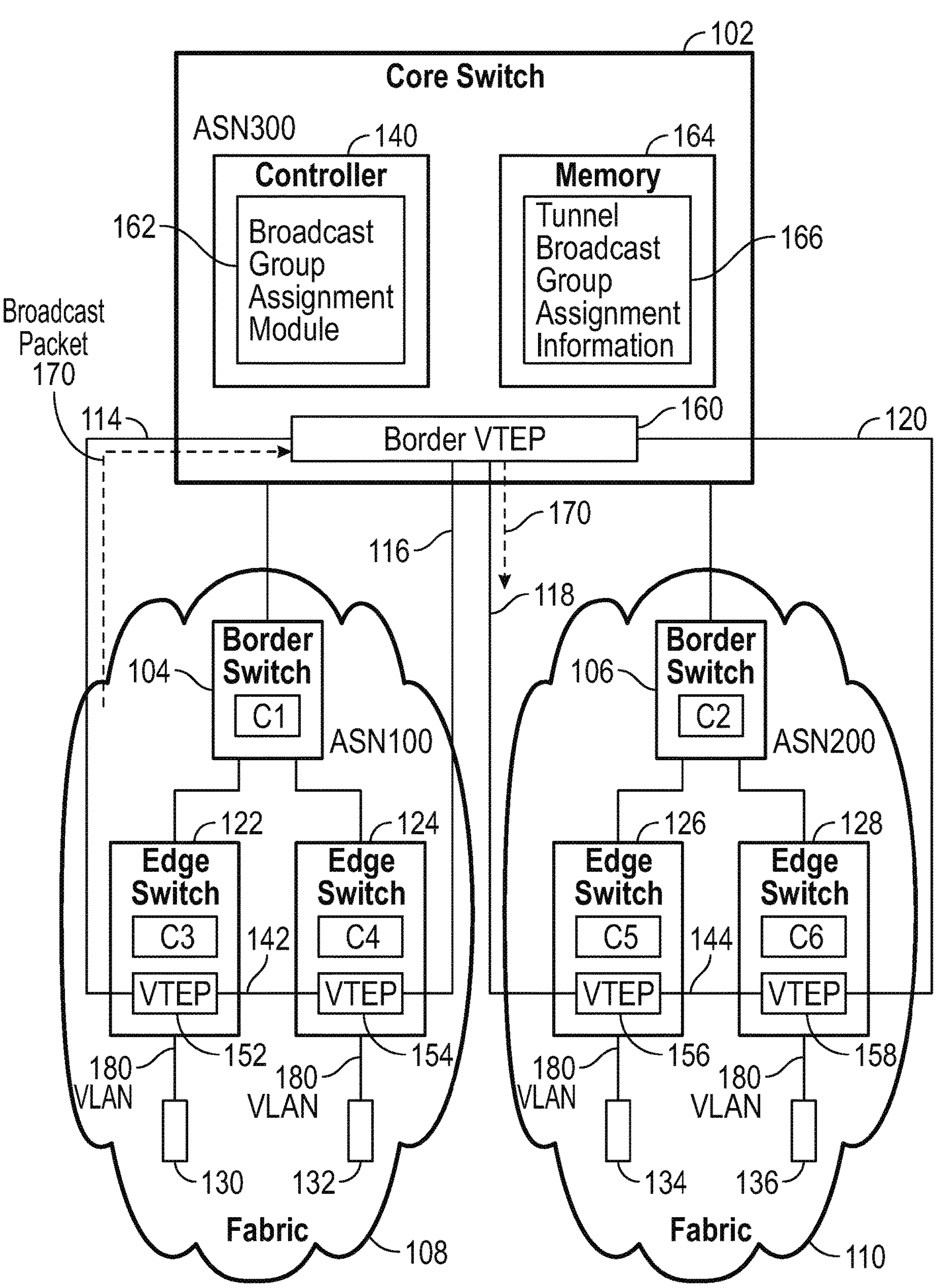
FIG. 1 and FIG. 2 are block diagrams of arrangements of switches for an underlay and overlay network, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A Layer 2 overlay network is implemented by encapsulating Layer 2 frames as payloads in Layer 3 packets, such as according to the Virtual Extensible Local Area Network (VXLAN) protocol. The Layer 3 packets are communicated through a Layer 3 underlay network. Based on use of an underlay and overlay network (in which a Layer 2 network overlays a Layer 3 network), Layer 2 virtual networks such as virtual local area networks (VLANs) can span across the Layer 3 network, possibly across different physical domains (e.g., different data centers, different campuses, different geographic sites, and so forth). The spanning of a VLAN across different physical domains refers to stretching or extending the VLAN across the different physical domains.

A network device, such as a switch or another type of network device, can include a data plane entity that performs VXLAN encapsulation and decapsulation. Such a data plane entity is referred to as a VXLAN tunnel endpoint (VTEP). The VTEP is part of the data plane of the underlay and overlay network used for forwarding of data by the network device. The network device also includes a control plane entity (that is part of the control plane of the underlay and overlay network) that exchanges control information with other network devices to enable forwarding of data by the network devices. In some examples, the control plane of the underlay and overlay network can operate according to the Ethernet Virtual Private Network (EVPN) technology.

A network environment may include multiple layers of network devices (e.g., multiple layers of switches). Network devices in a first layer may be connected to endpoint devices, such as computer servers, storage systems, communication nodes (e.g., wireless access points, base stations, etc.), and/or other devices for performing designated tasks. The network devices in the first layer may be connected to one or more network devices in a second layer. In some examples, the network devices in the first layer may be referred to as edge network devices (e.g., edge switches), and the network devices in the second layer may be referred to as border network devices. Edge network devices can include access network devices, leaf network devices, or any other network devices connected to endpoint devices. Border network devices can include aggregation network devices, core network devices, spine network devices, or any other network devices that connect edge or other border network devices to further networks.

The edge network devices in the first layer can include respective VTEPs. The VTEPs can be connected by VXLAN tunnels (or equivalently, VXLAN segments) to VTEP(s) in one or more border network devices of the second layer. In further examples, there may be more than two layers of network devices in network environments.

A host connected to a first VTEP (in an edge network device) may transmit a packet that may be forwarded to a broadcast group. A "host" can refer to a machine (e.g., an endpoint device), an electronic component in a machine, or a program executed in a machine. Such a packet is referred to as a "broadcast packet," which can refer to a broadcast, unknown unicast, or multicast (BUM) packet as explained further below. The broadcast packet may be forwarded through the first VTEP (after VXLAN encapsulation) and over a first tunnel to a border network device. Note that it is possible that the broadcast packet passes through one or more network devices between the first VTEP and the border network device.

In some cases, the border network device may be connected to multiple different physical domains, where each physical domain of the different physical domains includes a distinct arrangement of network devices. Physical domains can include fabrics, sites, or other types of physical domains. For cost savings, the border network device may be a common core network device shared by the physical domains. Instead of each physical domain being connected to a respective different core network device, multiple physical domains may connect to the same core network device. The core network device is to allow communication between the physical domains.

However, under certain scenarios, the core network device (or more generally a border network device) may not be able to forward a broadcast packet received over a first tunnel from a first physical domain to a second physical domain over a second tunnel. For example, in a first scenario, the core network device (such as a core switch 102 shown in FIG. 1 discussed further below) may be configured as a Border Gateway Protocol (BGP) peer of neighbor network devices (e.g., a first border switch 104 and a second border switch 106 in FIG. 1) in the first and second physical domains (e.g., a first fabric 108 and a second fabric 110 in FIG. 1). If the BGP peers of the core network device are part of the same broadcast group, then a split horizon rule implemented by the core network device may prevent the core network device (that is without mechanisms according to some implementations of the present disclosure) from forwarding the broadcast packet received over a first tunnel (e.g., a tunnel 114 or 116 in FIG. 1) from the first physical domain (e.g., the first fabric 108) from being forwarded over a second tunnel (e.g., a tunnel 118 or 120 in FIG. 1) to the second physical domain (e.g., the second fabric 110).

A "split horizon rule" refers to a way of preventing the advertisement of routes between peer network devices under certain conditions to prevent loops. The implementation of the split horizon rule may cause the core network device to block the forwarding of broadcast traffic between different physical domains including BGP peers in the same broadcast group as the core network device, to prevent forwarding loops in which broadcast traffic may potentially be forwarded back to a source of the broadcast traffic or to any network devices that are part of a physical domain that includes a BGP peer through which the broadcast traffic was originally received. Stated differently, the split horizon rule prevents the backflow of broadcast traffic to a physical domain from which the broadcast traffic was received.

A second scenario where a border network device may not be able to forward a broadcast packet between different domains involves a new physical domain (e.g., a new fabric 202 in FIG. 2) being added to existing physical domains (e.g., fabrics 204, 206, and 208 in FIG. 2) with respective border network devices (e.g., border switches 214, 216, and 218) connected in a full mesh. Border network devices of a set of physical domains may be connected in a full mesh if any one border network device of any given physical domain of the set is connected to border network devices of all other physical domains of the set. When the new physical domain is added to a network arrangement, a border network device (e.g., 212 in FIG. 2) of the new physical domain (this border device is referred to as a "new" border network device) may be connected to one of the border network devices in the existing physical domains (a border network device of an existing physical domain is referred to as an "existing" border network device) but not to existing border network devices of other existing physical domains. For example, the border switch 212 of the new fabric 202 in FIG. 2 may be connected to the border switch 214 of the existing fabric 204 but not to the border switches 216 and 218 of the existing fabrics 206 and 208. The new border network device may also be configured as a BGP peer of the existing border network device to which the new border network device is connected. As a result, after the new physical domain is added, the border network devices of the new and existing physical domains are connected in a partial mesh. If the new border network device is configured in the same broadcast group as the existing border network device to which the new border network device is connected, a broadcast packet sent from a client in any of the existing physical domains may not reach the new physical domain due to implementation of a split horizon rule by BGP peers.

In accordance with some implementations of the present disclosure, a "stitching" border network device that stitches network devices of multiple physical domains (such as in the first and second scenarios discussed above or in any other scenario) can be configured with different broadcast groups for different tunnels to the stitching border network device from the multiple physical domains. For example, the stitching border network device (e.g., the core switch 102 of FIG. 1 or the border switch 214 of FIG. 2) may be connected over a first tunnel (e.g., the tunnel 114 or 116 of FIG. 1 or a tunnel 236 in FIG. 2) to a first physical domain (e.g., the fabric 108 in FIG. 1 or the fabric 206 in FIG. 2), and over a second tunnel (e.g., the tunnel 118 or 120 in FIG. 1 or a tunnel 232 in FIG. 2) to a second physical domain (e.g., the fabric 110 in FIG. 1 or the fabric 202 in FIG. 2). In this example, the stitching border network device is assigned to a first broadcast group that also includes a border network device of the first physical domain. Additionally, the stitching border network device is assigned to a separate second broadcast group that also includes a border network device of the second physical domain. The stitching border network device is configured with a broadcast traffic rule specifying that broadcast traffic from a client in the first broadcast group is to be forwarded by the stitching border network device to network device(s) of the second broadcast group. By assigning multiple broadcast groups at the stitching border device, the blocking of broadcast traffic by a split horizon rule that prevents broadcast traffic from being forwarded to network devices that are BGP peers of the same broadcast group can be avoided.

A "broadcast group" refers to a grouping (or domain) of entities that are to receive a packet targeted to the broadcast group. In some examples, a packet may be forwarded to a broadcast group if the packet is part of broadcast, unknown unicast, or multicast (BUM) traffic. BUM traffic refers to any or some combination of: (1) data traffic that is sent to a broadcast address, (2) data traffic that has a unicast address for which a network device does not have information (e.g., the forwarding table of the network device is not populated with the unicast address so the network device does not know how to forward the data traffic), or (3) data traffic that is sent to a multicast address. As used here, "data traffic" (or more simply "traffic") can include one or more packets. Broadcast traffic can thus include one or more broadcast packets.

An autonomous system (AS) is based on a collection of IP routing prefixes, where a routing prefix (also referred to as a network prefix) identifies a network portion of an Internet Protocol (IP) address. The first part of the IP address is a network address that identifies a network (the "network portion"), and the second part of the IP address is a host address that identifies a host (e.g., a machine, an electronic component, or a program).

An autonomous system can be assigned an autonomous system number (ASN). An autonomous system may be controlled by a single provider, such as an Internet service provider (ISP) or another type of provider. In some cases, a single provider can control multiple autonomous systems. An autonomous system can also be referred to as a fabric, which is an example of a physical domain.

A site, which is another example of a physical domain, can refer to a geographically separate location (i.e., separate from another geographical location). For example, different sites may be located in different countries, different states or provinces, different cities, different parts of a city, different buildings or campuses, or other physical location. A site can include one or more autonomous systems (one or more fabrics).

In the ensuing discussion, reference is made to autonomous systems (or fabrics). In other examples, techniques or mechanisms according to some implementations of the present disclosure can be applied to network devices deployed in other types of physical domains.

A switch is able to forward data packets based on Layer 2 network addresses, such as Media Access Control (MAC) addresses, in the data packets. More generally, a "switch" refers to any network device in a network that is able to forward data packets along network paths, based on forwarding information in the data packets, where the forwarding information can include network addresses (e.g., Layer 2 network addresses, Layer 3 network addresses such as IP addresses), labels such as Multiprotocol Label Switching (MPLS) labels, or other forwarding information.

A "data packet" (or more simply, a "packet") refers to a unit of data. The packet can include a payload to carry data, which can include user data, program data, control information, or other types of data. The packet can also include a header that includes control fields, such as network address field(s), protocol field(s) to identify a protocol used, and other fields or parameters.

FIG. 1 is a block diagram of an example network arrangement that includes the fabrics 108 and 110 that share the core switch 102. The core switch 102 has a direct tunnels to the fabrics 108 and 110. A direct tunnel between the core switch 102 and a fabric does not pass through another switch. The core switch 102 is an example of a stitching network device that connects multiple physical domains, which in the example of FIG. 1 include the fabrics 108 and 110. By sharing the common core switch 102, additional stitching network devices do not have to be provided between the fabrics 108 and 110, which saves on infrastructure costs and reduces complexity.

The fabric 108 is a first autonomous system assigned an autonomous system number (ASN) of ASN100. The fabric 110 is a second autonomous system assigned ASN200. The core switch 102 is part of a third autonomous system assigned ASN300.

BGP refers to a protocol that supports routing among different autonomous systems. BGP peers are neighboring network devices that exchange routing information with one another. BGP can be used for routing within an autonomous system, which is referred to as interior BGP (iBGP). Alternatively, BGP can be used for routing between different autonomous systems, which is referred to as exterior BGP (eBGP). Although reference is made to BGP peers in some examples, the term "peer" can refer to any network device that is a neighbor of another network device; the neighboring network devices can exchange control information with one another to set up network paths, including setting up broadcast groups for forwarding broadcast traffic over tunnels to different physical domains.

In the example of FIG. 1, the core switch 102 in the autonomous system assigned ASN300 and the switch 104 in the autonomous system assigned AS100 are eBGP peers. Similarly, the core switch 102 in the autonomous system assigned ASN300 and the switch 106 in the autonomous system assigned AS200 are eBGP peers.

The edge switches 122, 124 and the switch 104 are in the same autonomous system (ASN100) and thus are iBGP peers. Similarly, the edge switches 126, 128 and the switch 106 are in the same autonomous system (ASN100) and thus are iBGP peers. Although a specific quantity of edge switches is depicted in each fabric of FIG. 1, in other examples, a fabric can include a different quantity of fabrics.

The switches 104 and 106 are also referred to as border switches. A "border switch" can refer to a core switch, an aggregation switch, or any other type of switch that is able to connect another switch to a different entity, where the different entity can be a switch, a network, or another entity.

An "edge switch" is a switch that connects to endpoint devices. Examples of edge switches include access switches, leaf switches, or any other switches that connect to endpoint devices. An "endpoint device" refers to an electronic device that is able to communicate over a network. Examples of endpoint devices include computers, wireless access points, storage systems, Internet of Things (IoT) devices, or any other types of electronic devices. An endpoint device is an example of a host that is able to perform communications of data in the network arrangement of FIG. 1. A host can also refer to an electronic component in the endpoint device, or a program executed in the endpoint device.

In the example of FIG. 1, the edge switch 122 is connected to an endpoint device 130, the edge switch 124 is connected to an endpoint device 132, the edge switch 126 is connected to an endpoint device 134, and the edge switch 128 is connected to an endpoint device 136. Note that an edge switch can connect to multiple endpoint devices.

The network arrangement of FIG. 1 includes an underlay and overlay network, in which an overlay network (an L2 network) is provided over an underlay network, which is an L3 network such as an IP network. The overlay network includes a control plane (e.g., that operates according to the EVPN technology) and a data plane that includes tunnels (e.g., VXLAN tunnels).

The control plane is implemented using controllers in respective switches, including a controller 140 in the core switch 102, controller C1 in the border switch 104, controller C2 in the border switch 106, and controllers C3, C4, C5, and C6 in respective edge switches 122, 124, 126, and 128. The controllers 140, C1, C2, C3, C4, C5, and C6 can operate according to EVPN in some examples. As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

The control plane performs control functionalities that support the forwarding of packets of the overlay network. For example, the control plane can perform network address learning (e.g., MAC address learning), which refers to a process of obtaining MAC addresses of devices that communicate over a network. As MAC addresses are learned, the MAC addresses are added to forwarding tables in switches that are used for forwarding packets. A forwarding table is also referred to as a forwarding information base (FIB).

EVPN is a standards-based technology that provides virtual multipoint bridged connectivity between different Layer 2 domains over a Layer 3 underlay network. EVPN is an extension to the Border Gateway Protocol (BGP) that allows the network to carry endpoint reachability information such as Layer 2 MAC addresses and Layer 3 IP addresses. According to EVPN, the Layer 2 overlay network (referred to as an EVPN-VXLAN overlay network) overlays an IP network. The controllers 140, C1, C2, C3, C4, C5, and C6 that operate according to EVPN can exchange reachability information so that VTEPs can interact with one another.

In the example of FIG. 1, the tunnel 114 is established between the edge switch 122 and the core switch 102, the tunnel 116 is established between the edge switch 124 and the core switch 102, the tunnel 118 is established between the edge switch 126 and the core switch 102, and the tunnel 120 is established between the edge switch 128 and the core switch 102. Note that it is possible for multiple tunnels to be established between a given pair of switches.

As further depicted in FIG. 1, a tunnel 142 is established between the edge switch 122 and the edge switch 124 (within the fabric 108), and a tunnel 144 is established between the edge switch 126 and the edge switch 128 (within the fabric 110). The tunnel 142 is an intra-fabric tunnel within the fabric 108, and the tunnel 144 is an intra-fabric tunnel within the fabric 110.

The tunnels 114, 116, 118, 120, 142, and 144 can be VXLAN tunnels in some examples. The tunnels 114, 116, 118, 120, 142, and 144 are part of the overlay network.

In other examples, other types of tunnels according to other technologies (e.g., different from EVPN and VXLAN) for an overlay network can be employed.

In examples shown in FIG. 1, the tunnel 114 is established between a VTEP 152 in the edge switch 122 and a border VTEP 160 in the core switch 102; the tunnel 116 is established between a VTEP 154 in the edge switch 124 and the border VTEP 160; the tunnel 118 is established between a VTEP 156 in the edge switch 126 and the border VTEP 160; and the tunnel 120 is established between a VTEP 158 in the edge switch 128 and the border VTEP 160. The tunnel 142 is established between the VTEP 152 in the edge switch 122 and the VTEP 154 in the edge switch 124; and the tunnel 144 is established between the VTEP 156 in the edge switch 126 and the VTEP 158 in the edge switch 128.

The VTEPs 152, 154, 156, 158, and 160 are part of the data plane of the overlay network. A VTEP can be implemented using one or more hardware processing circuits or a combination of the one or more hardware processing circuits and machine-readable instructions. For example, the VTEP can be implemented using an application specific integrated circuit (ASIC) device, or any other type of hardware processing circuitry.

As noted above, a VTEP can perform VXLAN encapsulation and decapsulation. VXLAN encapsulation encapsulates a Layer 2 packet by adding a VXLAN header. The VXLAN encapsulation produces an encapsulated packet that includes the VXLAN header and a payload including the encapsulated Layer 2 packet. The VXLAN header includes a virtual network identifier (VNI) that identifies a Layer 2 segment. The VNI is mapped to a VLAN; in other words, given a specific VNI, a VTEP can identify the corresponding VLAN, such as based on mapping information that correlates VNIs to VLANs (or more specifically, identifiers of VLANs). The combination of a VNI and an address (e.g., an IP address) of a VTEP (e.g., a VTEP in an edge switch) may uniquely identify a tunnel between the edge switch and the core switch 102. Note that there may be multiple VNIs used between a pair of VTEPs, e.g., the multiple VNIs identify respective VLANs. To uniquely identify a tunnel, a combination of a VNI and an address of a VTEP is used.

VXLAN decapsulation extracts the Layer 2 packet from the payload of the encapsulated packet, and removes the VXLAN header.

In accordance with some implementations of the present disclosure, the controller 140 includes a broadcast group assignment module 162 that is able to assign broadcast groups at the granularity of a tunnel so that different tunnels can be assigned to different broadcast groups. The broadcast group assignment module 162 can be implemented with a portion of the hardware circuitry of the controller 140 or as machine-readable instructions executable by the controller 140.

Based on interactions between the controller 140 of the core switch 102 and respective controllers C1, C3, and C4 in the fabric 108 (such as based on exchanges of EVPN control messages among the controllers), the tunnels 114 and 116 are established between the border VTEP 160 of the core switch 102 and respective VTEPs 152 and 154 in the edge switches 122 and 124. Similarly, based on interactions between the controller 140 of the core switch 102 and respective controllers C2, C5, and C6 in the fabric 110, the tunnels 118 and 120 are established between the border VTEP 160 of the core switch 102 and respective VTEPs 156 and 158 in the edge switches 126 and 128.

In some examples, the broadcast group assignment module 162 can assign the tunnels 114, 116 (which are connected to the fabric 108) to a first broadcast group, and can assign tunnels 118, 120 (which are connected to the fabric 110) to a second broadcast group. The broadcast group assignment module 162 identifies the tunnels that have been established between the border VTEP 160 of the core switch 102 and respective fabrics 108 and 110. The broadcast group assignment module 162 determines that the tunnels 114 and 116 are connected to one fabric (108) and that the tunnels 118 and 120 are connected to another fabric (110). The broadcast group assignment module 162 assigns tunnels connected to different fabrics to respective different broadcast groups. By being able to assign different broadcast groups to different tunnels connected to respective different fabrics, broadcast traffic received from a first tunnel of a first broadcast group can be forwarded by the border VTEP 160 in the core switch 102 over a second tunnel of a second broadcast group. For example, upon receiving a broadcast packet 170 originated by the endpoint device 130 over the tunnel 114 of one broadcast group, the border VTEP 160 can forward the broadcast packet 170 over the tunnel 118 of another broadcast group for receipt by the endpoint device 134 (or multiple destination endpoint devices). The border VTEP 160 can also forward a broadcast packet received over the tunnel 118 or 120 from the fabric 110 over the tunnel 114 or 116 to the fabric 108. More generally, the border VTEP 160 applies a broadcast traffic rule specifying that broadcast traffic from a client in a first broadcast group is to be forwarded by the border VTEP 160 to network device(s) of a second broadcast group.

If the broadcast group assignment module does not assign the tunnels connected to different fabrics to different broadcast groups (in other words the tunnels 114, 116, 118, and 120 are all assigned to the same broadcast group), then a split horizon rule implemented by the core switch 102 may prevent the core switch 102 from forwarding the broadcast packet received over a first tunnel (e.g., a tunnel 114 or 116 in FIG. 1) from the fabric 108 from being forwarded over a second tunnel (e.g., a tunnel 118 or 120 in FIG. 1) to the fabric 110 (and vice versa).

In further examples, the broadcast group assignment module 162 may assign each tunnel to a different broadcast group. For example, the broadcast group assignment module 162 may assign the tunnel 114 to a first broadcast group, the tunnel 116 to a second broadcast group, the tunnel 118 to a third broadcast group, and the tunnel 120 to a fourth broadcast group.

As noted above, a tunnel is identified based on a combination of a VNI and an address (e.g., an IP address) of a VTEP (e.g., a VTEP in an edge switch). Thus, the assignment of a tunnel to a broadcast group is based on the combination of a VNI and an address of a VTEP. A VNI is mapped to a VLAN by mapping information that correlates VNIs to VLANs (or more specifically, identifiers of VLANs).

In the example of FIG. 1, the endpoint devices 130, 132, 134, and 136 communicate over the same VLAN 180, which are mapped to a given VNI. In some examples, the VLAN 180 is stretched or extended across different physical domains, such as different autonomous systems as shown in FIG. 1. Broadcast packets that can be forwarded by the border VTEP 160 across different broadcast groups over respective tunnels can be communicated over the VLAN 180.

In examples where the endpoint devices 130, 132, 134, and 136 include wireless access points, a mobile device is able to move between the wireless access points while still being able to communicate data (including broadcast packets) over the VLAN 180.

The broadcast group assignment module 162 can maintain tunnel broadcast group assignment information 166, which is stored in a memory 164. The memory 164 can be implemented with one or more memory devices, including any or some combination of a dynamic random access memory (DRAM) device, a static random access memory (SRAM) device, a flash memory device, or any other type of memory device. The tunnel broadcast group assignment information 166 can map tunnels to broadcast groups to which the tunnels are assigned. The tunnel broadcast group assignment information 166 can include multiple entries, where each entry maps a tunnel to a corresponding broadcast group. The VTEP 160 is able to access the tunnel broadcast group assignment information 166 when forwarding broadcast packets between tunnels assigned to different broadcast groups.

By being able to forward broadcast packets at the border VTEP 160 based on the assignment of tunnels to different broadcast groups, network arrangements according to some examples of the present disclosure do not have to deploy separate core switches for the different fabrics 108 and 110 to support forwarding of broadcast packets between the different fabrics. By being able to share the same core switch 102 across multiple fabrics, the deployment cost of the network arrangement shown in FIG. 1 can be reduced as compared to network deployments that employ separate core switches for different fabrics. As an example, the fabric 110 may be a new fabric that can be added to the existing fabric 108. The new fabric 110 can simply be connected to the shared core switch 102 so that a new core switch does not have to be deployed along with the new fabric 110.

Figure 2:
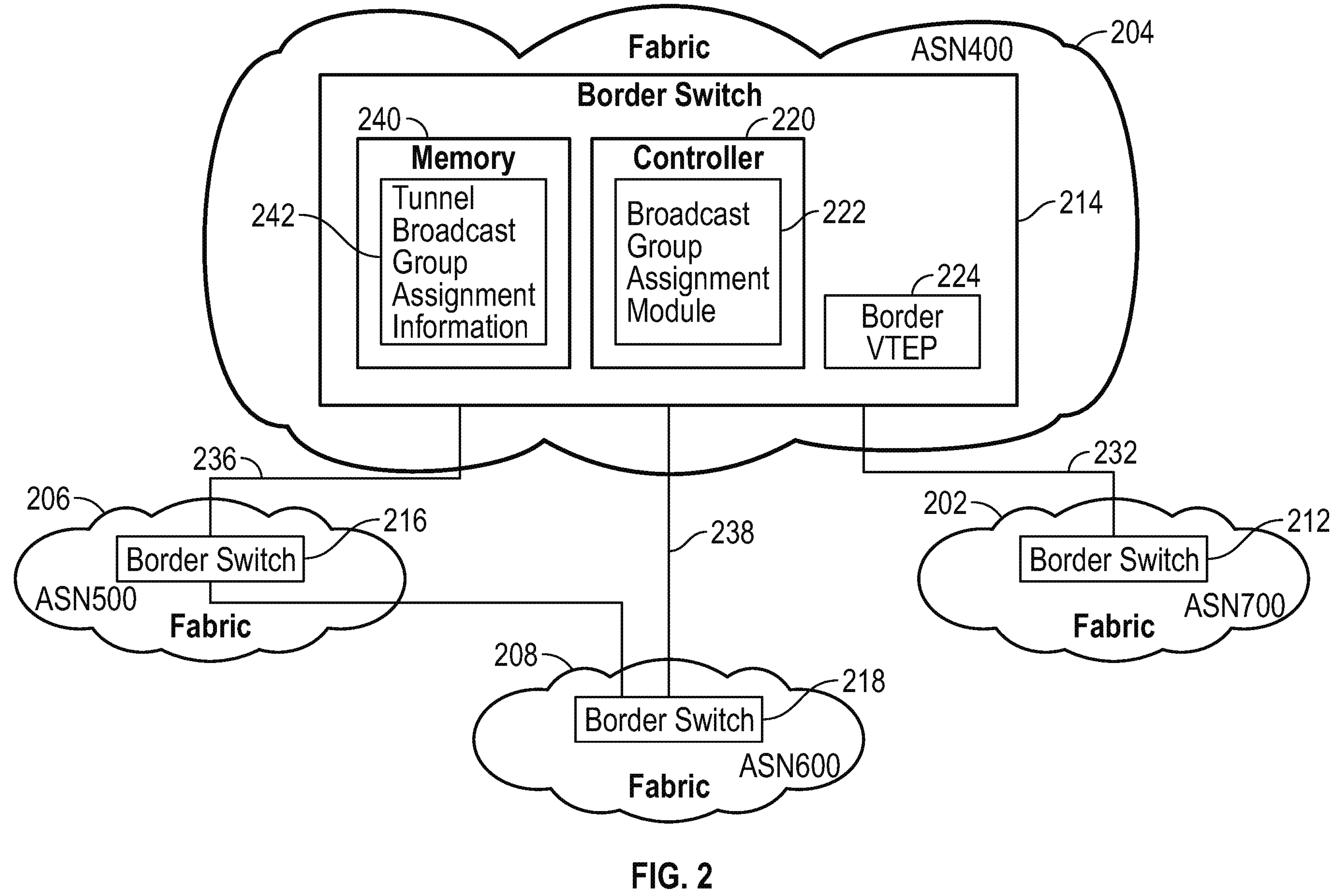

FIG. 2 is a block diagram of another example network arrangement that depicts the addition of a new fabric 202 to existing fabrics 204, 206, and 208. The existing fabrics 204, 206, and 208 include respective border switches 214, 216, and 218. The new fabric 202 has a border switch 212. Within each fabric, the corresponding border switch is connected to other switches (not shown), including edge switches connected to endpoint devices.

In some examples, the fabric 204 is an autonomous system assigned ASN400, the fabric 206 is an autonomous system assigned ASN500, the fabric 206 is an autonomous system assigned ASN500, the fabric 208 is an autonomous system assigned ASN600, and the fabric 202 is an autonomous system assigned ASN700.

The existing fabrics 204, 206, and 208 have a full-mesh connection arrangement in which the respective border switches 214, 216, and 218 are connected to each other. In other words, according to the full-mesh connection arrangement, the border switch 214 is connected to border switches 216 and 218, the border switch 216 is connected to border switches 214 and 218, and the border switch 218 is connected to border switches 214 and 216.

The new fabric 202 is added to the network arrangement after the existing fabrics 204, 206, and 208 have been deployed. Prior to the addition of the new fabric 202 to the network arrangement including the existing fabrics 204, 206, and 208, the border switches of the existing fabrics 204, 206, and 208 have a full-mesh connection. The border switch 212 of the new fabric 202 is connected to the border switch 214 of the existing fabric 204, but not to the border switches 216 and 218 of the other existing fabrics 206 and 208. As a result, after the new fabric 202 is added to the existing fabrics 204, 206, and 208, the border switches 212, 214, 216, and 218 of the new and existing fabrics have a partial-mesh connection, in which the border switch 212 is connected to the border switch 214 but not to the border switches 216 and 218.

The border switch 212 can be configured as an eBGP peer of the border switch 214, and each of the border switches 216 and 218 can similarly be configured as an eBGP peer of the border switch 214. Thus, if the new border switch 212 is configured in the same broadcast group as the existing border switch 214 to which the new border switch 212 is connected, a broadcast packet sent from an endpoint device in any of the existing fabrics 204, 206, and 208 may not reach the new fabric 202 due to a split horizon rule applied in the context of BGP peers. Similarly, a broadcast packet sent from an endpoint device in the new fabric 202 may not reach any of the existing fabrics 204, 206, and 208 due to a split horizon rule applied in the context of BGP peers.

However, in accordance with some implementations of the present disclosure, the border switch 214 includes a controller 220 with a broadcast group assignment module 222 that is able to assign tunnels connected with different fabrics to different broadcast groups. As shown in FIG. 2, the border switch 214 is connected by a tunnel 236 to the border switch 216, a tunnel 238 to the border switch 218, and a tunnel 232 to the border switch 212. More specifically, the tunnel 236 is connected between a border VTEP 224 in the border switch 214 to a VTEP (not shown) in the border switch 216, the tunnel 238 is connected between the border VTEP 224 in the border switch 214 to a VTEP (not shown) in the border switch 218, and the tunnel 232 is connected between the border VTEP 224 in the border switch 214 to a VTEP (not shown) in the border switch 212. The border VTEP 224 in the border switch 214 is similar to the border VTEP 160 shown in FIG. 1.

The broadcast group assignment module 222 assigns the tunnels 236 and 238 to a first broadcast group, and assigns the tunnel 232 to a second broadcast group that is different from the first broadcast group. The assignments of tunnels to respective broadcast groups can be stored by the broadcast group assignment module 222 in tunnel broadcast group assignment information 242 stored in a memory 240 of the border switch 214.

The border VTEP 224 in the border switch 214 is able to use the tunnel broadcast group assignment information 242 to forward broadcast packets received over a tunnel of the first broadcast group to a tunnel of the second broadcast group (or vice versa).

The assignment of tunnels to broadcast groups by a broadcast group assignment module (e.g., 162 in FIG. 1 or 222 in FIG. 2) may be based on configuration information provided to the broadcast group assignment module. The configuration information can be static configuration information provided to the broadcast group assignment module, such as by a network administrator or by another entity, such as a program or a machine.

In other examples, the configuration information provided to the broadcast group assignment module can include dynamic configuration information that is subject to change, such as due to changing network conditions or due to additions or removals of physical domains and/or network devices.

An example of configuration information can be in the following form:

```
BGP Peer Switch 1xx,
    Set broadcast group 1;
BGP Peer Switch 2xx,
    Set broadcast group 2.
```

Based on the above example configuration information, the broadcast group assignment module can perform a first detection of a first peer network device (e.g., the border switch 104 in FIG. 1 or the border switch 216 in FIG. 2) with a specific identifier (e.g., "1xx"). Based on the first detection, the broadcast group assignment module assigns a tunnel (or multiple tunnels) from a first fabric including the first peer network device with identifier 1xx to broadcast group 1. Similarly, based on the above example configuration information, the broadcast group assignment module can perform a second detection of a second peer network device (e.g., the border switch 106 in FIG. 1 or the border switch 212 in FIG. 2) with a specific identifier (e.g., "2xx"). Based on the second detection, the broadcast group assignment module assigns a tunnel (with identifier 2xx or multiple tunnels) from a second fabric including the second peer network device to broadcast group 2.

Figure 3:
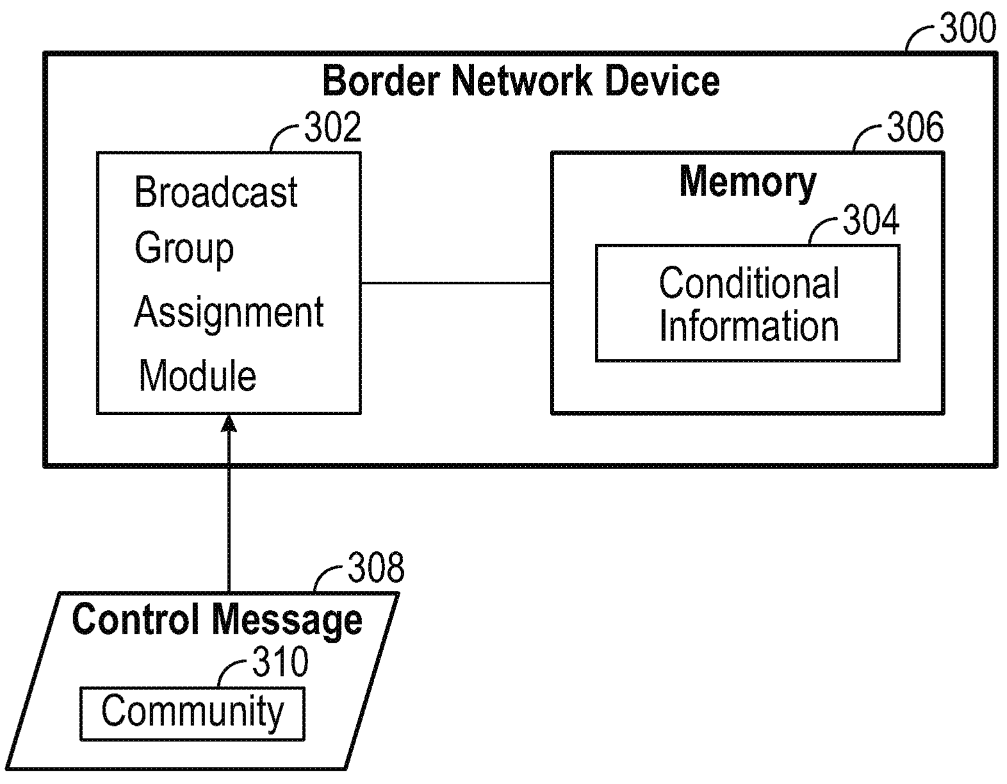
FIG. 3 and FIG. 4 are block diagrams of border network devices according to some examples.

In other examples, as shown in FIG. 3, a broadcast group assignment module 302 can assign tunnels to broadcast groups based on conditional information 304 stored in a memory 306 of a border network device 300. The conditional information 304 can include a BGP route-map, for example. A BGP route-map includes if-then program statements that check for specified conditions (referred to as "match conditions") and in response to such specified conditions, sets corresponding values. As an example, a route-map can include a match condition that has a community parameter, which is a BGP attribute. More generally, the conditional information 304 includes conditional logic that assigns values based on detected conditions including community parameters or other types of parameters.

A community parameter can be in the form of a tag associated with a network path (e.g., a route) advertised by one peer network device to another peer network device. The community parameter may be included in control messages (e.g., BGP messages) exchanged between network devices. The community parameter may be used to adjust routing policies at the network devices. An example of a BGP message is an Update message used to advertise routing information such as attributes of a network path and network prefixes. The Update message can also include a community parameter in some cases.

In accordance with some examples of the present disclosure, a community parameter 310 included in a control message 308 such as the BGP Update message can be used by the broadcast group assignment module 302 to control assignment of tunnels to broadcast groups. In some examples, the broadcast group assignment module 302 may receive a first control message including a first community parameter value from a first peer network device, and a second control message including a second community parameter value from a second peer network device. The broadcast group assignment module 302 can assign tunnels to respective broadcast groups according to the conditional information 304 based on the community parameter values in respective control messages. Based on application of the conditional information 304, the broadcast group assignment module 302 can match a community parameter value included in a control message (e.g., BGP Update message) sent from a peer network device to a given broadcast group, and the broadcast group assignment module 302 can assign a tunnel from the physical domain including the peer network device to the given broadcast group.

For example, in the context of FIG. 1, the controller C1 in the border switch 104 can include a community parameter set to a value (e.g., COMMUNITY_1) in a control message sent by the controller C1 to the controller 140 in the core switch 102. Similarly, in FIG. 1, the controller C2 in the border switch 106 can include a community parameter set to another value (e.g., COMMUNITY_2) in a control message sent by the controller C2 to the controller 140 in the core switch 102. As noted above, the border switches 104, 106 and the core switch 102 are BGP peers.

In the above example, in response to the community parameter in the control message from the border switch 104 having the value COMMUNITY_1, the broadcast group assignment module 162 can assign a tunnel (or multiple tunnels) from the fabric 108 including the border switch 104 to a first broadcast group according to conditional information (such as a route-map). Similarly, in response to the community parameter having the value COMMUNITY_1, the broadcast group assignment module 162 can assign a tunnel (or multiple tunnels) from the fabric 108 including the border switch 104 that advertised COMMUNITY_1 to a first broadcast group according to the conditional information.

The ability to assign tunnels to broadcast groups based on values of a parameter such as the community parameter in control messages enhances flexibility in how broadcast groups can be assigned to tunnels. By varying parameter values, for examples, tunnels can be assigned to different broadcast groups.

In some examples, a restricted range of configurable broadcast groups is available to a border VTEP (e.g., 160 in FIG. 1 or 224 in FIG. 2). A "configurable broadcast group" refers to a broadcast group that can be used by the border VTEP in forwarding broadcast traffic between physical domains. For example, a full range of broadcast groups may be 1 to 48. However, in this full range, broadcast groups 25 to 48 are configurable broadcast groups that are useable by the border VTEP, while broadcast groups 1 to 24 are reserved for other purposes and cannot be used by the border VTEP for purposes of forwarding broadcast traffic based on broadcast groups. In other examples, other example ranges of broadcast groups may be employed by network devices.

Figure 4:
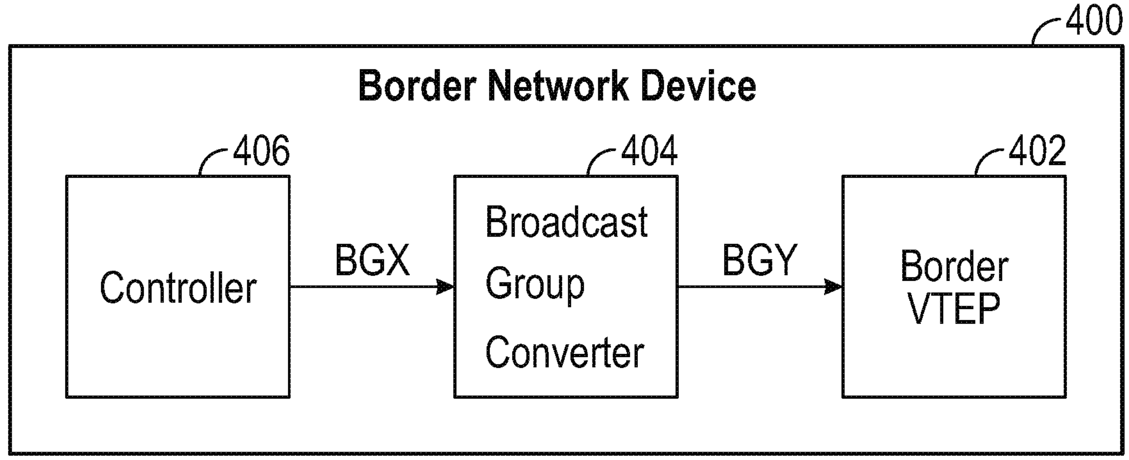

As shown in FIG. 4, in accordance with some examples of the present disclosure, network devices in a network arrangement may support broadcast groups that are outside of the restricted range of configurable broadcast groups useable by a border VTEP 402 in a border network device 400. The border network device 400 may be the core switch 102 of FIG. 1 or the border switch 214 of FIG. 2, for example.

To allow the border VTEP 402 to work with the other network devices in the network arrangement, a broadcast group converter 404 may be provided for use with the border VTEP 402. A controller 406 (e.g., the controller 140 or the controller 220 in a border switch as shown in FIG. 1 or 2) may assign tunnels to broadcast groups some of which may be outside the restricted range of configurable broadcast groups useable by the border VTEP 402. The broadcast group converter 404 is able to convert a broadcast group BGX from the controller 406 to a different broadcast group BGY within the restricted range of configurable broadcast groups useable by the border VTEP 402.

The broadcast group converter 404 may be implemented as a hardware component or as machine-readable instructions (such as plug-in program code or other forms of machine-readable instructions). If implemented as a plug-in program code, the broadcast group converter 404 can be added to the border VTEP 402 to support the conversion between a first range of broadcast groups and a second range of broadcast groups.

By using the broadcast group converter 404, the tunnel-based assignment techniques or mechanisms according to some examples of the present disclosure can be used with any type of border VTEP. Flexibility is enhanced since the tunnel-based assignment techniques or mechanisms are not constrained by what broadcast groups are supported by the border VTEP.

Figures 5, 6:
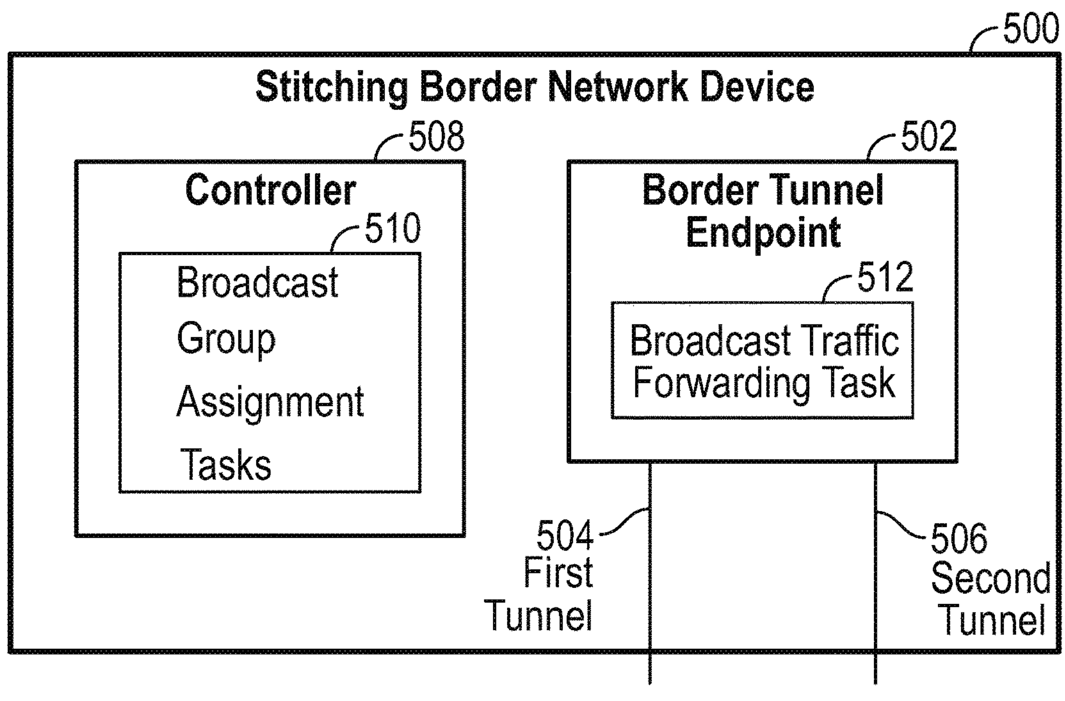
FIG. 5 is a block diagram of a stitching border network device according to some examples.
FIG. 6 is a block diagram of a storage medium storing machine-readable instructions according to some examples.

FIG. 5 is a block diagram of a stitching border network device 500 according to some examples of the present disclosure. In some examples, the stitching border network device 500 may be the core switch 102 of FIG. 1, or the border switch 214 of FIG. 2, or the border network device 300 of FIG. 3, or the border network device 400 of FIG. 4.

The stitching border network device 500 includes a border tunnel endpoint 502 to connect over a first tunnel 504 to a first network device of a first physical domain, and over a second tunnel 506 to a second network device of a second physical domain. For example, the border tunnel endpoint may include a border VTEP, such as any of 160, 224, or 402 in FIG. 1, 2, or 4.

The stitching border network device 500 includes a controller 508 to perform various tasks. For example, the controller 508 can include the controller 140, 220, or 406 in FIG. 1, 2, or 4.

The tasks of the controller 508 include broadcast group assignment tasks 510 to assign a first broadcast group that includes the stitching border network device 500 and the first network device of the first physical domain, and assign a second broadcast group that includes the stitching border network device 500 and the second network device of the second physical domain. More specifically, the broadcast group assignment tasks 510 can assign the first tunnel 504 from the first physical domain to the first broadcast group, and assign the second tunnel 506 from the second physical domain to the second broadcast group. In some examples, the first and second broadcast groups are assigned at a granularity of tunnels connected to the stitching border network device 500. Assigning broadcast groups at the granularity of tunnels by a controller (e.g., the controller 508) in a stitching border network device refers to assigning one broadcast group to a first collection of tunnels (including one or more tunnels) connected to the stitching border network device that is different from another broadcast group assigned to a second collection of tunnels (including one or more tunnels) connected to the stitching border network device.

The border tunnel endpoint 502 can perform a broadcast traffic forwarding task 512. The broadcast traffic forwarding task 512 includes receiving broadcast traffic over the first tunnel 504 from the first network device in the first broadcast group, and forwarding the broadcast traffic over the second tunnel 506 to the second network device in the second broadcast group.

In some examples, the controller 508 performs a first detection that the first physical domain includes a first neighbor network device that is a peer (e.g., a BGP peer) of the stitching border network device 500. The controller 508 assigns the first broadcast group based on the first detection. The controller 508 performs a second detection that the second physical domain includes a second neighbor network device that is a peer (e.g., a BGP peer) of the stitching border network device 500. The controller 408 assigns the second broadcast group based on the first detection.

In some examples, the controller 508 applies a rule (e.g., a stitching rule as discussed further above) that blocks the stitching border network device 400 from forwarding broadcast traffic between different physical domains including peers in a same broadcast group as the core network device.

In some examples, the stitching border network device 500 includes a memory to store conditional information relating to creation of broadcast groups. For example, the conditional information may include a route-map. The controller 508 receives a first control message (e.g., a first BGP Update message) from the first network device. Based on matching a parameter in the first control message to the conditional information, the controller 508 assigns the first broadcast group including the stitching border network device 500 and the first border network device. The controller 508 receives a second control message (e.g., a second BGP Update message) from the second network device. Based on matching a parameter in the second control message to the conditional information, the controller 508 assigns the second broadcast group including the stitching border network device 500 and the second border network device.

In some examples, the border tunnel endpoint 502 employs a restricted range of broadcast groups. The stitching border network device 500 includes a broadcast group converter (e.g., 404 in FIG. 4) to convert between a first range of broadcast groups and a different second range of broadcast groups.

FIG. 6 is a block diagram of a non-transitory machine-readable or computer-readable storage medium 600 storing machine-readable instructions that upon execution cause a stitching border network device including a border tunnel endpoint to perform various tasks.

The machine-readable instructions include first tunnel information reception instructions 602 to receive first information associated with a first tunnel between a first physical domain and the border tunnel endpoint of the stitching border network device. In some examples, the first information associated with the first tunnel can include information identifying the first physical domain or a first peer network device in the first physical domain. In other examples, the first information associated with the first tunnel can include a first value of a community parameter in a first control message from the first peer network device.

The machine-readable instructions include first broadcast group assignment instructions 604 to assign, based on the first information, the first tunnel to a first broadcast group. The assignment may be based on configuration information or conditional information as discussed further above.

The machine-readable instructions include second tunnel information reception instructions 606 to receive second information associated with a second tunnel between a second physical domain and the border tunnel endpoint of the stitching border network device. In some examples, the second information associated with a second tunnel can include information identifying the second physical domain or a second peer network device in the second physical domain. In other examples, the second information associated with the second tunnel can include a second value of the community parameter in a second control message from the second peer network device.

The machine-readable instructions include first broadcast group assignment instructions 608 to assign, based on the second information, the second tunnel to a second broadcast group different from the first broadcast group. The assignment may be based on configuration information or conditional information as discussed further above.

The machine-readable instructions include tunnel broadcast group assignment information storage instructions 610 to store, in a memory, tunnel broadcast group assignment information useable by the border tunnel endpoint to forward broadcast traffic between the first tunnel and the second tunnel.

Figure 7:
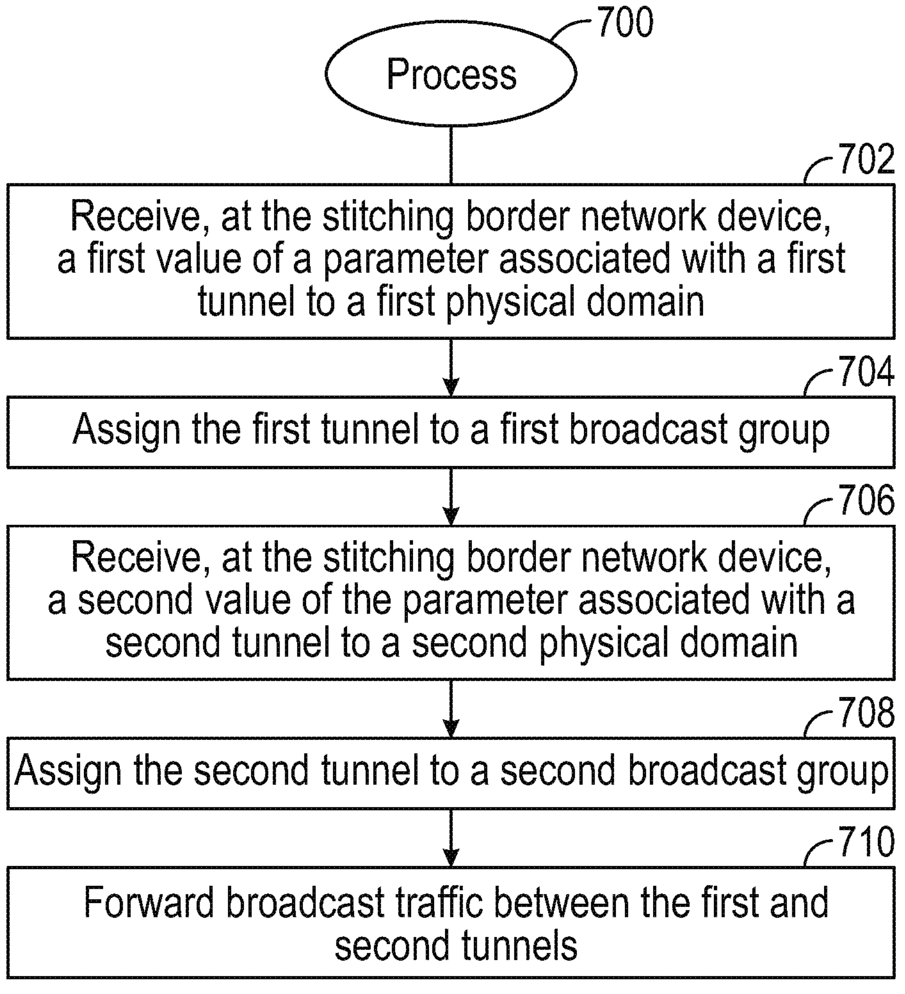
FIG. 7 is a flow diagram of a process according to some examples.

FIG. 7 is a flow diagram of a process 700 according to some examples. The process 700 can be performed by a stitching border network device, for example. The process 700 includes receiving (at 702), at the stitching border network device, a first value of a parameter associated with a first tunnel between a first physical domain and a border tunnel endpoint of the stitching border network device. The parameter can be a community parameter included in a BGP control message, for example.

The process 700 includes assigning (at 704), by the stitching border network device based on the first value of the parameter, the first tunnel to a first broadcast group. The assignment may be based on a route-map or another type of conditional information, for example.

The process 700 includes receiving (at 706), at the stitching border network device, a second value of the parameter associated with a second tunnel between a second physical domain and the border tunnel endpoint of the stitching border network device. The process 700 includes assigning (at 708), by the stitching border network device based on the second value of the parameter, the second tunnel to a second broadcast group different from the first broadcast group.

In some examples, the first value of the parameter is received from a first peer network device of the stitching border network device, and the second value of the parameter is received from a second peer network device of the stitching border network device, where the first peer network device is part of the first physical domain, and the second peer network device is part of the second physical domain.

The process 700 includes forwarding (at 710), by the border tunnel endpoint, broadcast traffic between the first tunnel and the second tunnel based on the assignment of the first tunnel to the first broadcast group and the assignment of the second tunnel to the second broadcast group.

A storage medium (e.g., 600 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A stitching border network device comprising:
- a border tunnel endpoint to connect over a first tunnel to a first network device of a first physical domain, and over a second tunnel to a second network device of a second physical domain;
- a memory to store conditional information relating to creation of broadcast groups, and
- a controller to:
  - receive a control message from the first network device,
  - based on matching a parameter in the control message to the conditional information, assign a first broadcast group comprising the stitching border network device and the first network device of the first physical domain, and
  - assign a second broadcast group comprising the stitching border network device and the second network device of the second physical domain, wherein the border tunnel endpoint is to:
  - receive broadcast traffic over the first tunnel from the first network device in the first broadcast group, and
  - forward the broadcast traffic over the second tunnel to the second network device in the second broadcast group.

2. The stitching border network device of claim 1, wherein the controller is to:
- perform a first detection that the first physical domain includes a first neighbor network device that is a peer of the stitching border network device,
- assign the first broadcast group based on the first detection,
- perform a second detection that the second physical domain includes a second neighbor network device that is a peer of the stitching border network device, and assign the second broadcast group based on the first detection.

3. The stitching border network device of claim 2, wherein the first neighbor network device of the first physical domain and the second neighbor network device of the second physical domain are Border Gateway Protocol (BGP) peers of the stitching border network device.

4. The stitching border network device of claim 2, wherein the controller is to apply a rule that blocks the stitching border network device from forwarding broadcast traffic between different physical domains including peers in a same broadcast group as the stitching border network device.

5. The stitching border network device of claim 1, wherein the first and second broadcast groups are assigned at a granularity of tunnels connected to the stitching border network device.

6. The stitching border network device of claim 1, wherein the stitching border network device is a common core network device shared by the first and second physical domains.

7. The stitching border network device of claim 1, wherein the stitching border network device is part of a third physical domain and has a full mesh connection to the first network device of the first physical domain and a third network device of a fourth physical domain.

8. The stitching border network device of claim 7, wherein the first network device is a border network device of the first physical domain, the second network device is a border network device of the second physical domain, and the third network device is a border network device of the fourth physical domain.

9. The stitching border network device of claim 8, wherein prior to an addition of the second physical domain to a network arrangement comprising the first physical domain, the third physical domain, and the fourth physical domain as existing physical domains, the stitching border network device, the border network device of the first physical domain, and the border network device of the fourth physical domain have a full-mesh connection, and wherein after the addition of the second physical domain to the network arrangement, the stitching border network device, the border network device of the first physical domain, the border network device of the second physical domain, and the border network device of the fourth physical domain have a partial-mesh connection.

10. The stitching border network device of claim 1, comprising:

a memory to store tunnel broadcast group assignment information comprising assignments of tunnels including the first and second tunnels to respective broadcast groups, wherein the border tunnel endpoint is to use the tunnel broadcast group assignment information in the forwarding of the broadcast traffic.

11. The stitching border network device of claim 1, wherein the control message comprises a first control message, and wherein the controller is to:

receive a second control message from the second network device, and based on matching a parameter in the second control message to the conditional information, assign the second broadcast group comprising the stitching border network device and the second network device.

12. The stitching border network device of claim 1, wherein the first control message comprises a Border Gateway Protocol (BGP) control message.

13. The stitching border network device of claim 12, wherein the conditional information comprises a route-map.

14. The stitching border network device of claim 13, wherein the parameter comprises a community parameter, wherein the route-map specifies that the first broadcast group is assigned based on a first value of the community parameter, and wherein the route-map specifies that the second broadcast group is assigned based on a second value of the community parameter.

15. The stitching border network device of claim 1, wherein the border tunnel endpoint employs a restricted range of broadcast groups, and the stitching border network device comprises:

a broadcast group converter to convert between a first range of broadcast groups and a different second range of broadcast groups.

16. A non-transitory machine-readable storage medium storing machine-readable instructions that upon execution cause a stitching border network device comprising a border tunnel endpoint to:

receive a first control message associated with a first tunnel between a first physical domain and the border tunnel endpoint of the stitching border network device;

apply conditional information based on matching a parameter value in the first control message to assign the first tunnel to a first broadcast group;

receive a second control message associated with a second tunnel between a second physical domain and the border tunnel endpoint of the stitching border network device;

apply the conditional information based on matching a parameter value in the second control message to assign the second tunnel to a second broadcast group different from the first broadcast group; and store, in a memory, tunnel broadcast group assignment information useable by the border tunnel endpoint to forward broadcast traffic between the first tunnel and the second tunnel.

17. A method comprising:

storing, by a stitching border network device, conditional information related to creation of broadcast groups;

receiving, at the stitching border network device, a first value of a parameter associated with a first tunnel between a first physical domain and a border tunnel endpoint of the stitching border network device;

assigning, by the stitching border network device based on matching the first value of the parameter to the conditional information, the first tunnel to a first broadcast group;

receiving, at the stitching border network device, a second value of the parameter associated with a second tunnel between a second physical domain and the border tunnel endpoint of the stitching border network device;

assigning, by the stitching border network device based on matching the second value of the parameter to the conditional information, the second tunnel to a second broadcast group different from the first broadcast group; and forwarding, by the border tunnel endpoint, broadcast traffic between the first tunnel and the second tunnel based on the assignment of the first tunnel to the first broadcast group and the assignment of the second tunnel to the second broadcast group.

18. The method of claim 17, wherein the first value of the parameter is received from a first peer network device of the stitching border network device, and the second value of the parameter is received from a second peer network device of the stitching border network device, the first peer network device being part of the first physical domain, and the second peer network device being part of the second physical domain.

* * * * *